United States Patent [19]
Kimura et al.

[11] Patent Number: 5,521,364
[45] Date of Patent: May 28, 1996

[54] PRODUCT-SELLING-DATA PROCESSING APPARATUS HAVING FUNCTION FOR ADMINISTERING SALES OF ARTICLE SOLD BY THE BUNDLE AND ITS METHOD

[75] Inventors: Yoshiharu Kimura; Akihiro Kikuchi, both of Shizuoka-ken, Japan

[73] Assignee: Kabushiki Kaisha TEC, Shizuoka, Japan

[21] Appl. No.: 249,477

[22] Filed: May 26, 1994

Related U.S. Application Data

[63] Continuation of Ser. No. 882,530, May 13, 1992, abandoned.

[30] Foreign Application Priority Data

May 13, 1991 [JP] Japan ................................. 3-107283

[51] Int. Cl.$^6$ ............................................... G06K 15/00
[52] U.S. Cl. ..................................... 255/383; 364/405
[58] Field of Search ................................. 364/404, 405, 364/406, 405; 235/383

[56] References Cited

U.S. PATENT DOCUMENTS

| | | | |
|---|---|---|---|
| 4,589,069 | 5/1986 | Endo et al. | 364/405 |
| 4,800,493 | 1/1989 | Takagi | 364/405 |
| 4,833,609 | 5/1989 | Grulke, Jr. | 364/405 |

FOREIGN PATENT DOCUMENTS

| | | |
|---|---|---|
| 55-164965 | 12/1980 | Japan . |
| 56-114064 | 9/1981 | Japan . |
| 59-66773 | 4/1984 | Japan . |

OTHER PUBLICATIONS

Matsutame, "Combined Discount Sale System for Plural Commodities Group", Japanese Abstract 02–36496, Feb. 6, 1990.

*Primary Examiner*—Donald T. Hajec
*Assistant Examiner*—Jeffrey R. Filipek
*Attorney, Agent, or Firm*—Oblon, Spivak, McClelland, Maier & Neustadt

[57] ABSTRACT

A product-selling-data processing apparatus which performs a bundle-of-selling in which a predetermined number of a same kind of articles each having a unit price are sold in a lump at a price lower than the total of the unit price of the predetermined number of the articles, includes an article code inputting device for inputting a first article code identifying an article to be sold, a memory for memorizing price data including the unit price of the articles and a bundle-of-selling price of the articles, and article code data including the first article code and a second article code identifying an article to be sold as a bundle-of-selling, the second article code being modified based on the first article code, the price data being memorized in correspondence with the article code data, a discerning device for discerning whether the article indicated the first article code inputted by the article code inputting device, can be sold as the bundle-of-selling, a first calculation device for calculating selling data based on the bundle-of-selling price specified by the second article code which corresponds to the first article code when the first article code is inputted by the article code inputting device and the bundle-of-selling is carried out, a first memory control device for memorizing the selling data calculated by the first calculation device in the memory device.

4 Claims, 8 Drawing Sheets

| ARTICLE CODE | ARTICLE NAME DATA | UNIT PRICE DATA | TOTAL SOLD ARTICLE NUMBER DATA | TOTAL SOLD AMOUNT DATA |
|---|---|---|---|---|
| 000000000001 | CHOCOLATE | 200 | | |
| 3000000000001 | BUNDLED THREE CHOCOLATE | 550 | | |
| 5000000000001 | BUNDLED FIVE CHOCOLATE | 900 | | |
| 7000000000001 | BUNDLED SEVEN CHOCOLATE | 1200 | | |
| 000000000002 | CARAMEL | 100 | | |
| 3000000000002 | BUNDLED THREE CARAMEL | 270 | | |
| 5000000000002 | BUNDLED FIVE CARAMEL | 430 | | |
| 7000000000002 | BUNDLED SEVEN CARAMEL | 600 | | |

17a  17b  17c  17d  17e

17

| ARTICLE CODE | ARTICLE NAME DATA | UNIT PRICE DATA | TOTAL SOLD ARTICLE NUMBER DATA | TOTAL SOLD AMOUNT DATA |
|---|---|---|---|---|
| 000000000001 | CHOCOLATE | 200 | | |
| 3000000000001 | BUNDLED THREE CHOCOLATE | 550 | | |
| 5000000000001 | BUNDLED FIVE CHOCOLATE | 900 | | |
| 7000000000001 | BUNDLED SEVEN CHOCOLATE | 1200 | | |
| 000000000002 | CARAMEL | 100 | | |
| 3000000000002 | BUNDLED THREE CARAMEL | 270 | | |
| 5000000000002 | BUNDLED FIVE CARAMEL | 430 | | |
| 7000000000002 | BUNDLED SEVEN CARAMEL | 600 | | |
| | | | | |

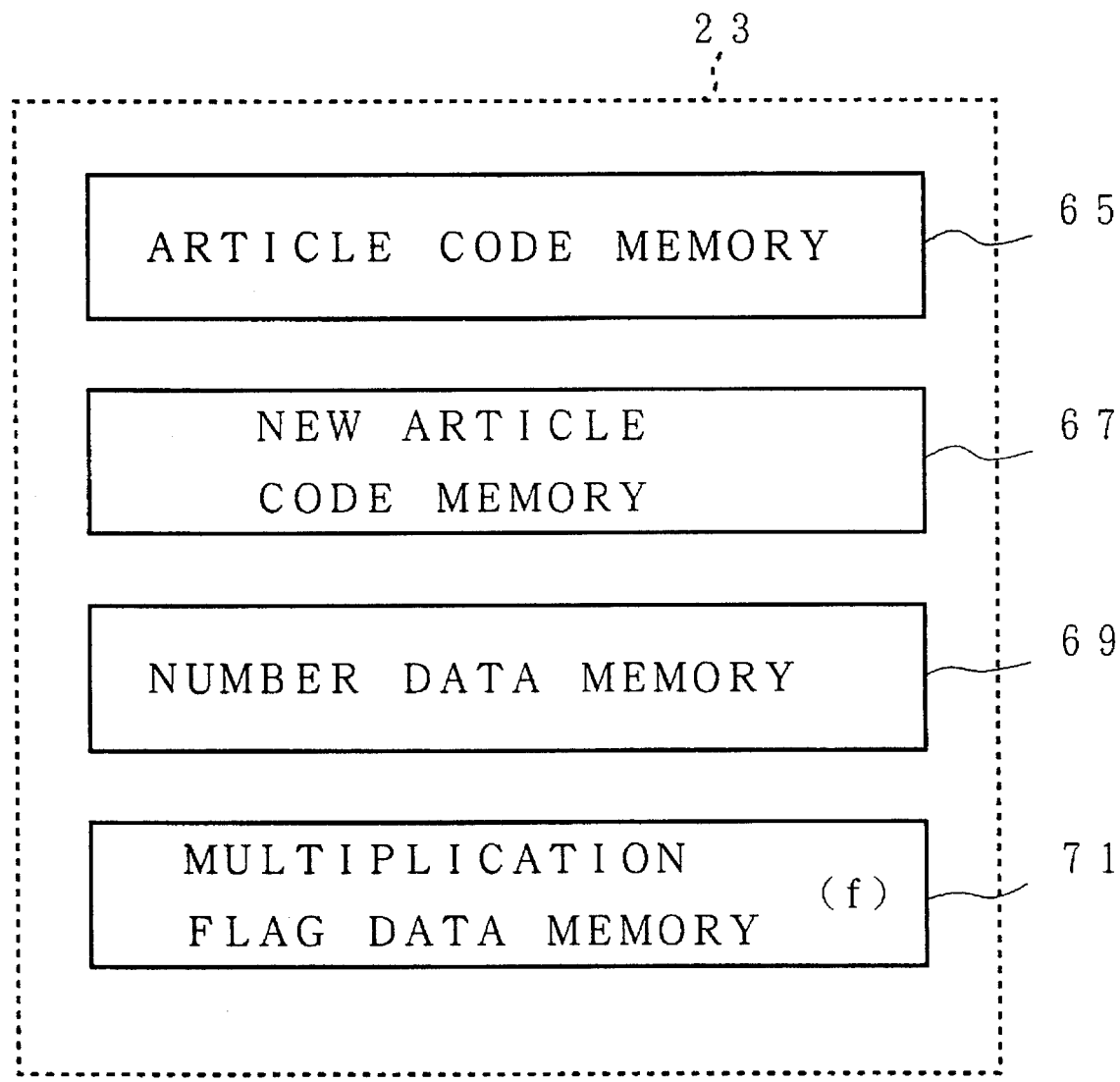
F I G. 8

PRODUCT-SELLING-DATA PROCESSING APPARATUS HAVING FUNCTION FOR ADMINISTERING SALES OF ARTICLE SOLD BY THE BUNDLE AND ITS METHOD

This application is a continuation of application Ser. No. 07/882,530, filed on May 13, 1992, now abandoned.

BACKGROUND OF THE INVENTION

1. Field of the Invention

The present invention relates to a product-selling-data processing apparatus for performing transaction of selling data such as an electronic cash register and a point of sale (POS) system, which includes a plurality of POS terminals and a central computer which receives data from each POS terminal and processes the data.

2. Description of the Related Art

Recently, the following selling method has been used in supermarkets, for example, they sell three chocolates each of which is priced at 1 dollar singly, for the price of 2 dollars and 50 cents, which is a 50 cent reduction. This selling method is often used when a plurality of certain articles are sold in one transaction to reduce by a predetermined amount the total charge. This selling method is called the bundle-of-selling.

The product-selling-data processing apparatus which is provided with a function for the bundle-of-selling method has an input means for inputting an article code indicating a specific article.

When a central computer of the product-selling-data processing apparatus detects the article code of a specific article previously predetermined as a bundle-of-selling item, the value of a counter provided in the central computer is incremented by one. Furthermore, if the value of the counter equals a predetermined value, the product-selling-data processing apparatus performs the price reducing transaction.

A selling totaling memory section is provided in the product-selling-data processing apparatus, in which the article selling data is totaled and in which is stored every article code, and every article's sales in accordance with the data in the selling totaling memory section.

However, in such a product-selling-data processing apparatus, the total selling data of an article is administered by one article code affixed to the article beforehand. If the article is previously determined as a bundle-of-selling item, it is possible to administer the total sales of the article per one article unit, but it is difficult to administer the total sales of the article, when the article is sold at a discount as a bundle-of-selling item.

In such a product-selling-data processing apparatus as described above, it is possible to administer the article by bundle-of-selling by distinguishing an article code which indicates a single article sale from an article code which indicates a bundle-of-selling item sale. However, in this case it requires the input of several different article codes for a single type of article, and it is very inconvenient to the operator.

SUMMARY OF THE INVENTION

It is an object of the present invention to provide a product-selling-data processing apparatus for administering the article selling data of a predetermined article as a bundle-of-selling article, in accordance with the article code affixed to an article beforehand, when selling as a single unit or as a bundle-of-selling articles at reduced prices. It is not necessary to input several different article codes against an article. Accordingly, the invention allows administration of the article selling data of an article reduced and sold by bundle-of-selling without trouble.

In order to achieve the above object of the present invention, there is provided a product-selling-data processing apparatus which performs a bundle-of-selling in which a predetermined number of units of a given article each having a unit price are sold in a lump at a price lower than the total of the unit price of the predetermined number of the articles, the apparatus comprising an article code inputting section for inputting a first article code identifying an article to be sold, a memory section for storing price data including the unit price of the articles and a bundle-of-selling price of the articles, and article code data including the first article code and a second article code identifying an article to be sold as a bundle-of-selling, the second article code being modified based on the first article code, the price data being memorized in correspondence with the articles code data, a discerning section for discerning whether the article indicated the first article code inputted by the article code inputting section, can be sold as the bundle-of-selling, a first calculation section for calculating selling data based on the bundle-of-selling price specified by the second article code which corresponds to the first article code when the first article code is inputted by the article code inputting section and the bundle-of-selling is carried out, and first memory control section for storing the selling data calculated by the first calculation section in the memory section.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings, wherein like reference numerals throughout the various figures denote like structure elements, and wherein:

FIG. 8 is a view showing a part of a memory map of a RAM shown in FIG. 3 according to the second embodiment;

DETAILED DESCRIPTION OF THE PREFERRED EMBODIMENTS

Figures 1, 2:
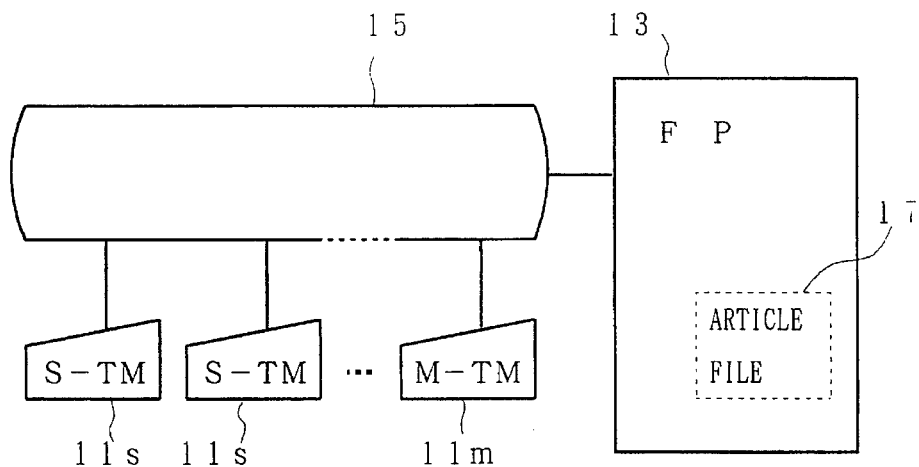
FIG. 1 is a view showing the constitution of a POS system according to the first and second embodiments of the present invention.
FIG. 2 is a table of articles in a file processor shown in FIG. 1.

A product-selling-data processing apparatus according to the first embodiment of the present invention will be described in more detail with reference to FIGS. 1 to 7.

A POS system (A product-selling-data processing apparatus) includes a plurality of POS terminals 11, a file processor (FP) 13 and a communication-line 15, and each POS terminal connects the file processor 13 through the communication-line 15.

There are two types of POS terminals, one is a master terminal 11m (M-TM) and the others are satellite terminals 11s (S-TM). Usually the file processor 13 is connected with one master terminal 11m and a plurality of satellite terminals 11s. The satellite terminals 11s have a function, such as transmission of the article selling data which is inputted to the file processor 13 and issuing a paper receipt on which the article selling data is printed. The master terminal 11m has a first function which is the same as that of the satellite terminal, and a second function which allows an article code to be added to or eliminated from the article file 7 in the file processor 13.

File processor 13 is provided with an article file 17 (memory means).

The article file 17 includes an article code column 17a including a plurality of rows for storing different article codes respectively, an article name data column 17b for storing the article name data corresponding to each article code, a unit price data column 17c for storing the unit price data of an article or the unit price data of a bundle-of-selling article corresponding to each article code, total sold article number data column 17d for storing the number of sales of each article corresponding to each article code, and total sold amount data column 17e for storing the total sold amount data for each article corresponding to each article code.

The article code column 17a, the article name data column 17b, and the unit price data column 17c correspond to an article information memory section, and the total sold article number data column 17d and the total sold amount data column 17e correspond to an article selling data memory section.

Figure 3:
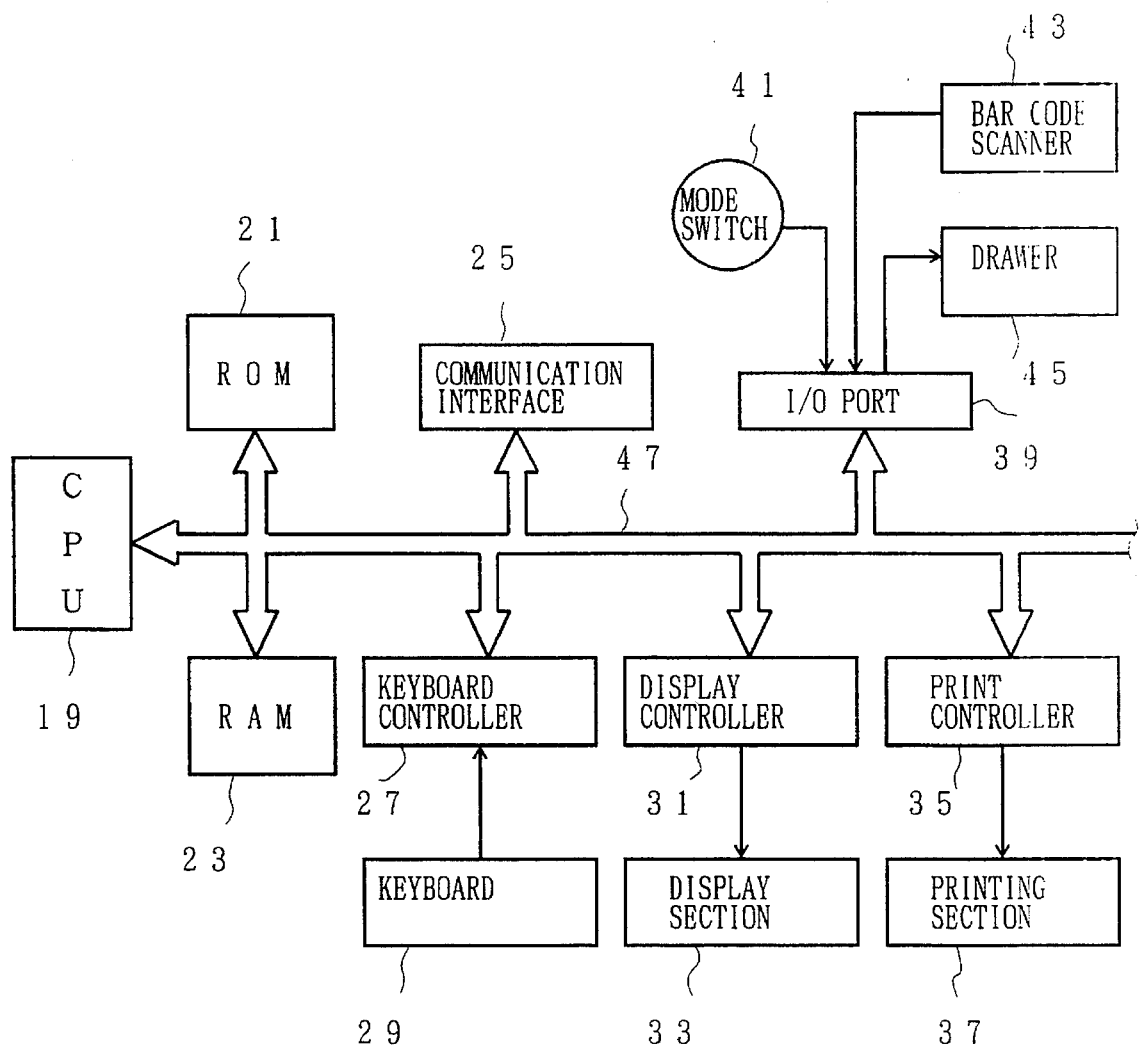
FIG. 3 is a block diagram of a POS terminal shown in FIG. 1.

This POS terminal 11 is generally installed on the floor of a supermarket for example. As shown in FIG. 3 the POS terminal comprises a CPU 19, a ROM 21, a RAM 23, a communication interface 25, a keyboard controller 27, a display controller 31, a print controller 35, and an I/O port 39. These circuit elements are connected to one another through bus line 47 consisting of address, data, and control buses. The keyboard controller 27 is connected to a keyboard 29, the display controller 31 is connected to a display section 33 and the print controller 35 is connected to a printing section 37. A selection signal is inputted to the I/O port 39 in response to a selection through a mode switch 41. The mode switch 41 is to select one of a plurality of modes which are the registration, checking, clearing and establishment modes, by rotating the key type switch. The CPU 19 performs a transaction of registration, checking, clearing, or establishment in accordance with the selection signal. A reading signal fed from a bar code scanner 43 (article code inputting means) is inputted to the I/O port 39. A drawer 45 temporarily stores some money and is opened by an opening signal output from the I/O port 39.

The ROM 21 stores control programs for the CPU 19. Upon prosecution of the control programs stored in the ROM 21, the CPU 19 performs operations in the registration, check, clearing, or establishment mode. The RAM 23 stores data inputted to and output from the CPU 19 in these operations. The communication interface 25 is used to control data communication with a file processor 13 installed in an office to manage various job files. For example, an inquiry about prices of items, and a transaction report are performed through the communication interface 25. The keyboard controller 27 controls the keyboard 29 and supplies the key input data from the keyboard 29 to the CPU 19. The display controller 31 controls the display section 33 to cause display data from the CPU 19 to be displayed on the display section 33. The printing controller 35 controls the printing section 37 to cause printing data supplied from the CPU 19 to be printed at the printing section 37.

Figure 4:
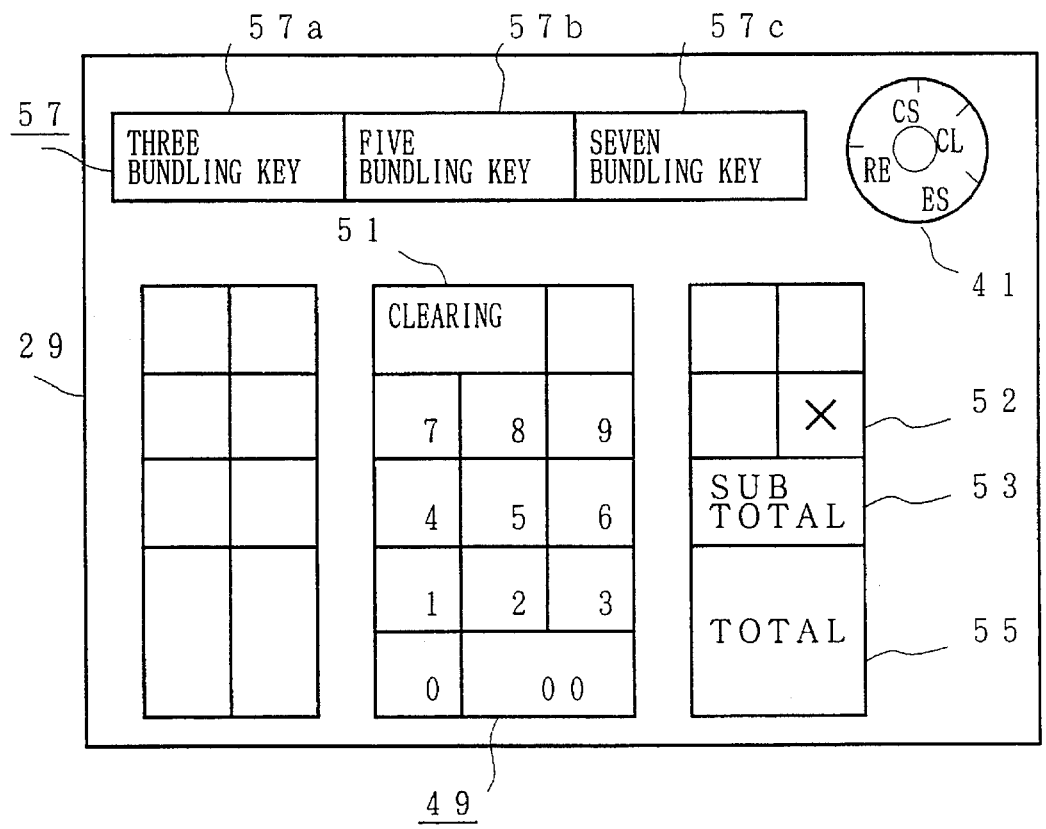
FIG. 4 is a plan view showing a detailed arrangement of a keyboard shown in FIG. 3.

A plurality of numeric keys 49, a clearing key 51, a multiplication key 52, a subtotal key 53, a total key 55, and bundle-of-selling proclamation keys 57 (indicating data input means), and so on, are arranged on the top of the keyboard 29 as shown in FIG. 4. The bundle-of-selling proclamation key 57 includes three different keys, for example a first key 57a (hereinafter refered as a three bundling key) is used when the number of articles sold as a bundle-of-selling is three. A second key 57b (hereinafter refered as a five bundling key) is used when the number of articles sold as a bundle-of-selling is five. A third key 57c (hereinafter refered as a seven bundling key) is used when the number of articles sold as a bundle-of-selling is seven.

Figure 5:
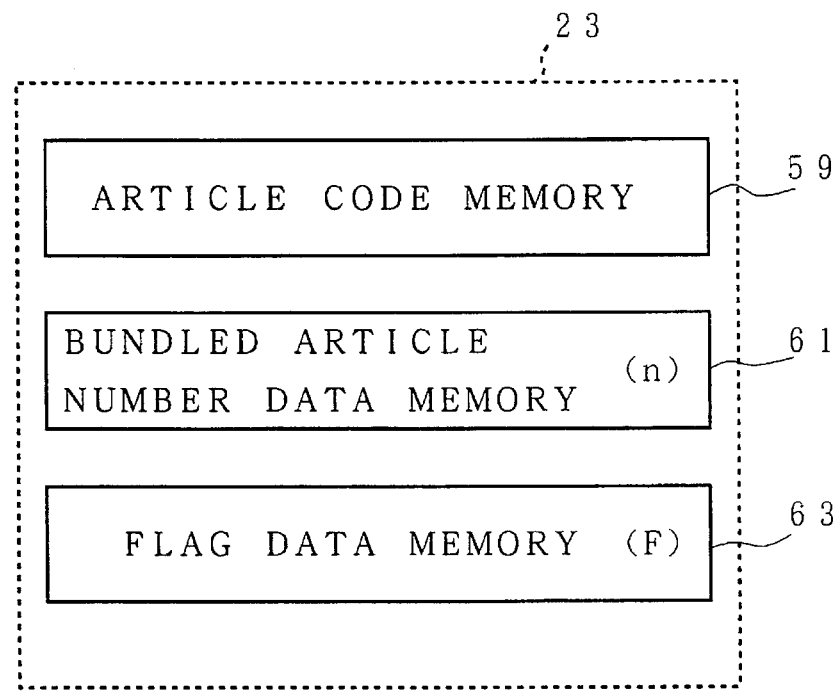
FIG. 5 is a view showing a part of a memory map of a RAM shown in FIG. 3 according to the first embodiment.

As shown in FIG. 5, RAM 23 includes an article code memory 59 for storing each article code indicating a registered article, a bundled article number data memory 61 for storing a bundle-of-selling number data (n) which is indicated by one of the bundle-of-selling proclamation keys 57. RAM 23 also includes a flag data memory 63 for storing "1", as a bundling flag data (F) (a bundle-of-selling indicating data), when the bundle-of-selling is performed.

Figure 6:
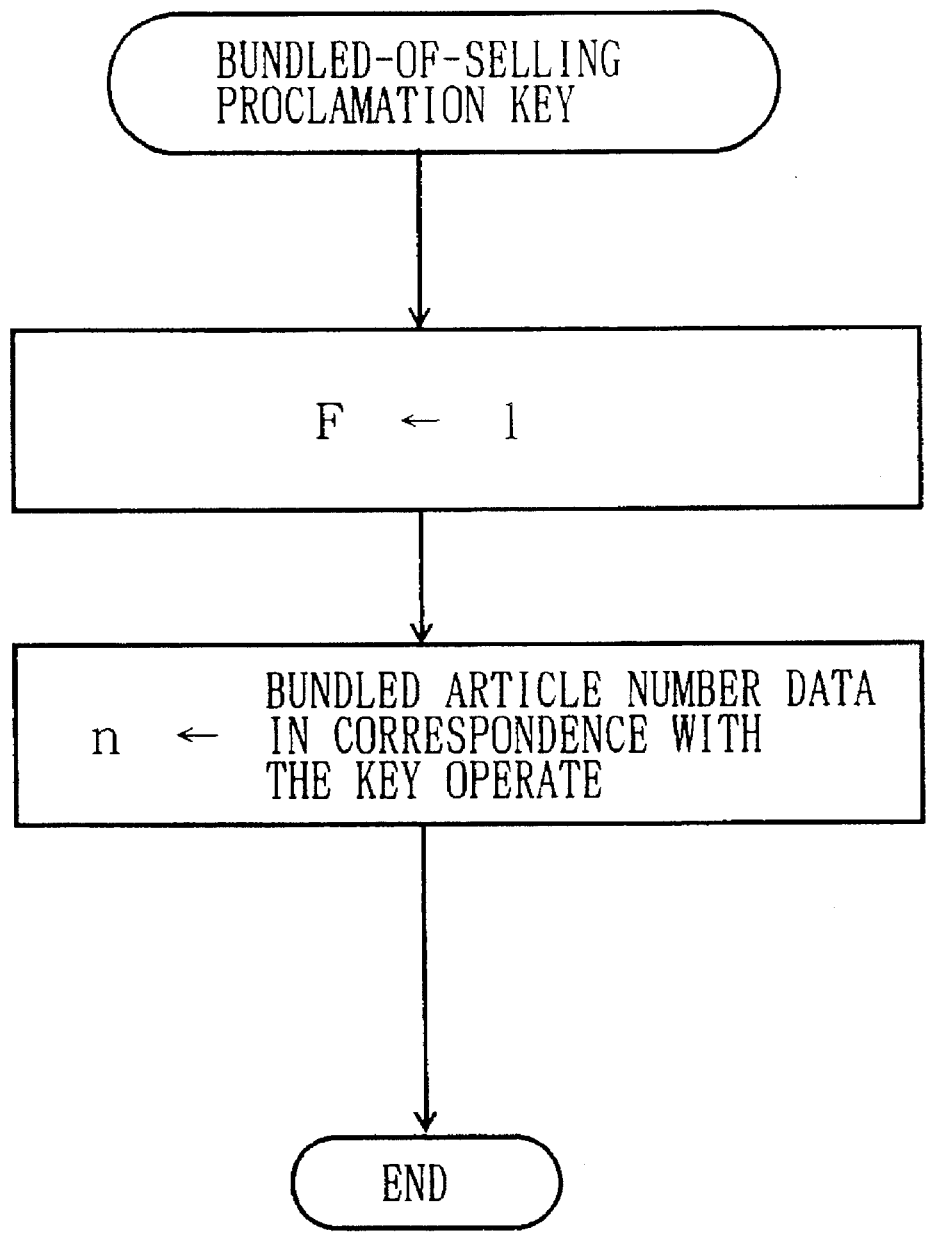
FIG. 6 is a flow chart showing a bundle-of-selling proclamation of the POS terminal according to the first embodiment.

The CPU 19 performs a transaction, as shown in FIG. 6, when one of the bundle-of-selling proclamation keys 57 on the keyboard 29 is operated under the registration mode which has been selected by the mode switch 41. Thus, "1" is established in the flag data memory 63 as the bundling flag data (F), and the number of corresponding bundle articles to be sold (n) is stored in the bundled article number data memory 61.

Figure 7:
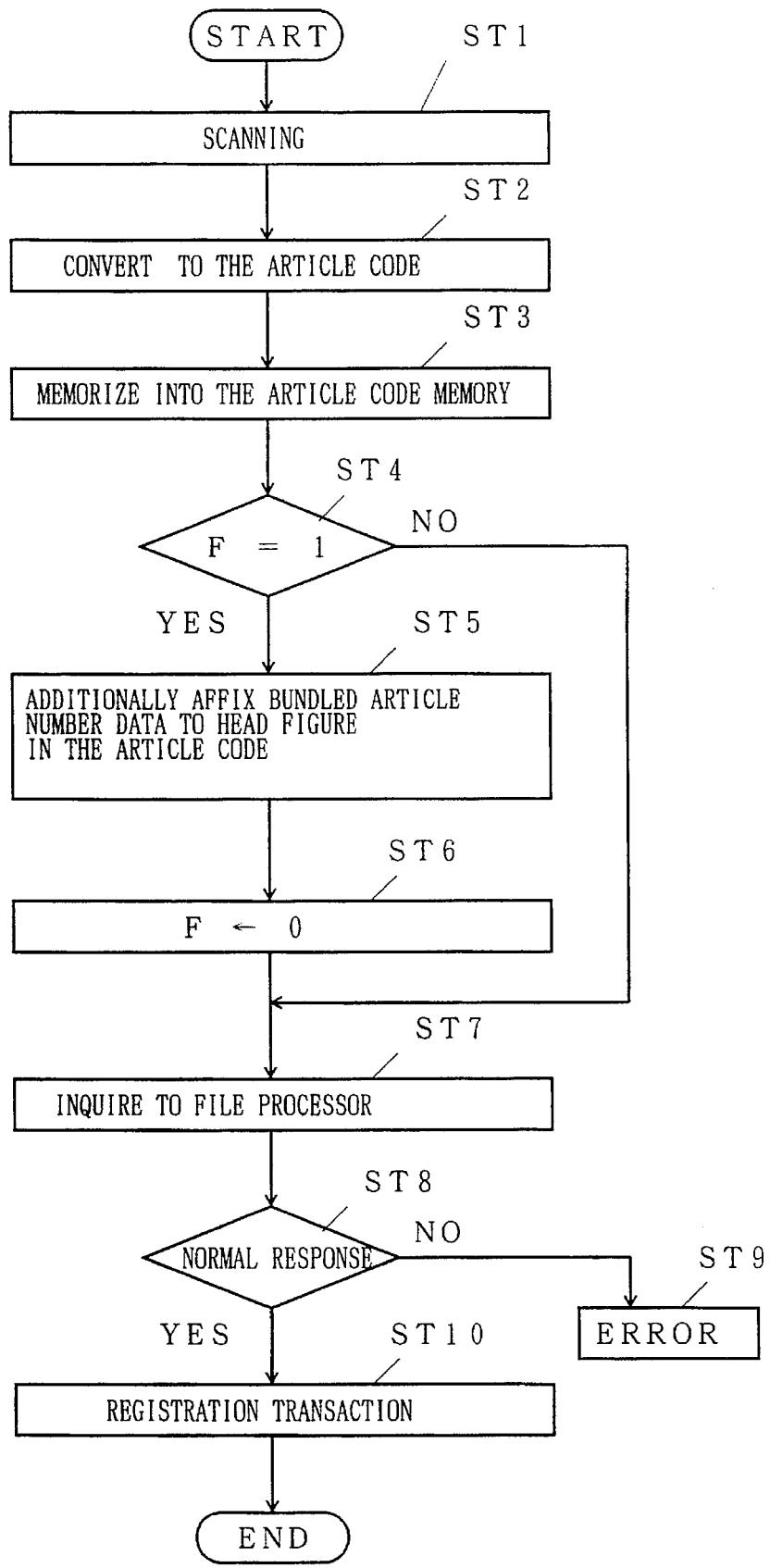
FIG. 7 is a flow chart showing a bundle-of-selling registration of the POS terminal according to the first embodiment.

The CPU 19 further performs a transaction as shown in FIG. 7. In step ST1, bar code data, converted from an article code, which is generally attached to an article as a bar code label is read by bar code scanner 43. The bar code data output from bar code scanner 43 is inversely converted to the article code (in step ST2) and the article code is stored in the article code memory 59 (in step ST3). In step ST4, the status of the bundling flag data (F) in the flag data memory 63 is examined.

If "1" is stored in the flag data memory 63 as the bundling flag data (F), the YES-path is taken. Otherwise, the NO-path is taken. When the YES-path is taken in step ST4, an article code for the bundle-of-selling is framed based on the article code memorized in the article code memory 59 (in step ST5). The article code for the bundle-of-selling is framed such that the bundled article number data (n) memorized in the bundled article number memory 61 is added, as a head figure, to the numerical row of the article code memorized in the article code memory 59. In step ST6, the bundling flag data (F) in the flag data memory 63 is cleared to "0". In step ST7, the article information data, including article name data and article unit price data, which corresponds to the article code for the bundle-of-selling framed in step ST5, is inquired to the file processor 13. (first calculation means) The POS terminal 11 receives a response from the file processor 13. In step ST8, the response is examined.

If the article information data is received, the YES-path is taken. Otherwise, the NO-path is taken. When the YES-path is taken in step ST8, the article selling data (a selling data) is obtained in accordance with the article information data. The article selling data includes a sold article number data and a sold amount data. The article selling data is transmitted to the file processor 13. The article selling data is added to the previously memorized article selling data in the article file 17 (in step ST10).

If the NO-path is taken in step 4, the above-described step ST7 is executed. The article information data in accordance with the article code which is memorized in the article code memory 59 is inquired to the file processor 13. (second calculation means) The subsequent transaction is the same as that of the above-described step ST7.

The file processor 13 searches the article file 17 in accordance with the article code which is transmitted from the POS terminal 11 when the file processor 13 receives the article code from the POS terminal 11. If the same article code as the article code transmitted from POS terminal 11 is memorized in the article file 17, the article information data in correspondence with the article code transmitted is read out from the article file 17. The article information data is transmitted to the POS terminal 11 which inquired to the file processor 13. If the file processor 13 receives data which is the article code and the article selling data (i.e. a sold article number data and a sold amount data) from the POS terminal 11, the article selling data is added to the previously memorized article selling data in the article file 17. The sold article number data is added to the previously memorized sold article number data in the total sold article number data area 17d in correspondence with the article code received. The sold amount data is added to the previously memorized total sold amount data area 17e in correspondence with the article code received. (first memory control means and second memory control means)

According to the first embodiment, the article information data and the article selling data are memorized in article file 17 in correspondence with the article code of each article. So, on the bundle-of-selling articles, the article information data and the article selling data are memorized in correspondence with the article code for the bundle-of-selling. The article code for the bundle-of-selling is framed by additionally affixing the bundle article number data at the head figure of the article code which is used by an article selling. The article name data and the unit price data are memorized as the article information data of each the article and name data for the bundle-of-selling article and selling amount data are memorized as the article information data of the bundle-of-selling articles.

For example, as shown at FIG. 2, if three chocolates whose article code is [000000000001] are sold as the bundle-of-selling, the article code for the bundle-of-selling becomes [3000000000001] if five, the article code for the bundle-of-selling becomes [5000000000001] and if seven, the article code for the bundle-of-selling becomes [7000000000001].

The bar code label is affixed to the article [chocolate]. The bar code is printed on the bar code label. The bar code is converted from the article code of the chocolate.

In case a predetermined article is registered as the bundle-of-selling article, a cashier (operating manager of terminal 11) discerns whether the article is a bundle-of-selling article, and whether the number of the article which is bought is the bundled article number. And if the bundle-of-selling is possible, the cashier operates the bundle-of-selling proclamation keys 57 in correspondence with the bundled article number. The cashier operates the bar code scanner 43. The bar code data is read by the bar code scanner 43. Then, the bundled article number data is added, as a head figure, to the numerical row of the article code converted from bar code data. The bundled article number data is a data in correspondence with the bundle-of-selling proclamation keys 57 which are operated. Thus, the article code for the bundle-of-selling is automatically framed. The selling registration transaction is performed in accordance with the article code which is framed.

If the bundle-of-selling is impossible, a cashier seperates the bar code scanner 43. The bar code data is read by the bar code scanner 43. The selling registration transaction is performed in accordance with the article code which is converted from bar code data.

For example, in the case of three chocolates bundled together bought by a customer, the cashier operates the three bundling key 57a, and the bar code scanner 43. The bar code scanner 43 reads the bar code which is affixed on the chocolate. Since the article code of the chocolate is [000000000001] (first article code), "3", which is the bundled article number data, is additionally affixed at the head figure in the article code. Thus [3000000000001] is framed as the article code for bundle-of-selling. The article information data of the article code which is framed is inquired to the file processor 13. In this case, since [3000000000001] (second article code) is memorized in the article file 17, the article information data in correspondence with [3000000000001] is received from file processor 13. The article information data includes "bundled three chocolate" as the article name data and "550" (bundle-of-selling price) as the unit price data. The article information data is printed on receipt paper and displayed on the display section 33. The article selling data is then transmitted to the file prosessor 13. The article selling data (selling data) includes "1" as the sold article number data and "550" as the sold amount data. Then "1" is added to the previously memorized total sold article number data in the total sold article number data area 17d in correspondence with [3000000000001] as the article code in the article file 17. And "550" is added to the previously memorized total sold amount data in the total sold amount data area 17e in correspondence with [3000000000001] as the article code in the article file 17.

In case of one chocolate which is predetermined as the bundle-of-selling is bought by customer, the cashier operates the bar code scanner 43. The bar code scanner 43 reads the bar code which is affixed on the chocolate. The article information data of the article code is inquired to the file processor 13. Since the article code read by the bar code scanner 43 is [000000000001], the article information data which includes "chocolate" as the article name data and "200" as the unit price is received from file processor 13. The article information data is printed to the receipt paper and displayed at the display section 33. And the article selling data which includes "1" as the sold article number data and "200" as the sold amount data is transmitted to the file prosessor 13. Then "1" is added to the previously memorized total sold article number data in the total sold article number data area 17d in correspondence with [000000000001] as the article code in the article file 17, and "200" is added to the previously memorized total sold amount data in the total sold amount data area 17e in correspondence with [000000000001] as the article code in the article file 17.

According to this embodiment, it is possible to administer the article selling data of the predetermined article as the bundle-of-selling article, when it is sold as either an individual article unit or as a bundle-of-selling article by reducing the prices. Further the cashier inputs the same article code when it is sold as either the bundle-of-selling or as an article unit, accordingly saving the cashier's time.

In this embodiment, three bundle-of-selling proclamation keys 57 are prepared in correspondence with the bundled article number. However, it is possible to input the bundled article number in combination with one bundle-of-selling proclamation key in combination with the numeric keys.

In this embodiment, the bundled article number data is additionally affixed as the head figure in the article code when the article code for the bundle-of-selling is framed. However, the position where the bundled article number data is affixed is not restricted. Other number data which is not related to the bundled article number data may be additionally affixed when the article code is framed. In this embodiment, the article code which is framed may have one more figure than the general article codes. However, it is possible to make the number of figures in the article code framed for bundled articles and the number of figures in the general article code equal by changing an unused figure to generate the bundled article number data.

Moreover, a counter for counting the number of each article which is inputted may be provided and the article code for the bundle-of-selling may be framed automatically when the number in the counter reaches the predetermined number. Then the operation for performing the bundle-of-selling may be easier.

The second embodiment will be described with reference to FIGS. 8–10. The same reference numerals as in the first embodiment denote the same parts in the second embodiment, and a detailed description thereof will be omitted or simplified.

The bundle-of-selling proclamation keys 57 are used in the first embodiment. However, the bundle-of-selling proclamation keys 57 are not used in the second embodiment. The number of articles purchased is inputted by the numeric keys 49 and the multiplication key 52 is operated and the bar code data is read by the bar code scanner 43, when a plurality of the same article is sold. For example, when three chocolates are bought by a customer, the cashier operates the numeric keys 49, multiplication key 52 and the bar code scanner 43. "3" is inputted by the numeric keys 49 and the multiplication key 52 is operated and the bar code which is affixed on the chocolate is read by the bar code scanner 43. When the multiplication key 52 is operated, the article code for the bundle-of-selling is framed. The article code in the article file 14 is then searched in accordance with the article code framed. If an article code which is the same as the article code framed is memorized in the article file 14, the bundle-of-selling is performed. If an article code which is the same as article code framed is not memorized in the article file 14, the multiplicative registration transaction is performed in accordance with the inputted article code. Thus it is possible to administer the article selling data of the articles which are sold by the bundle-of-selling, even if the bundle-of-selling proclamation keys 57 are not provided in the product-selling-data processing apparatus.

Figure 9:
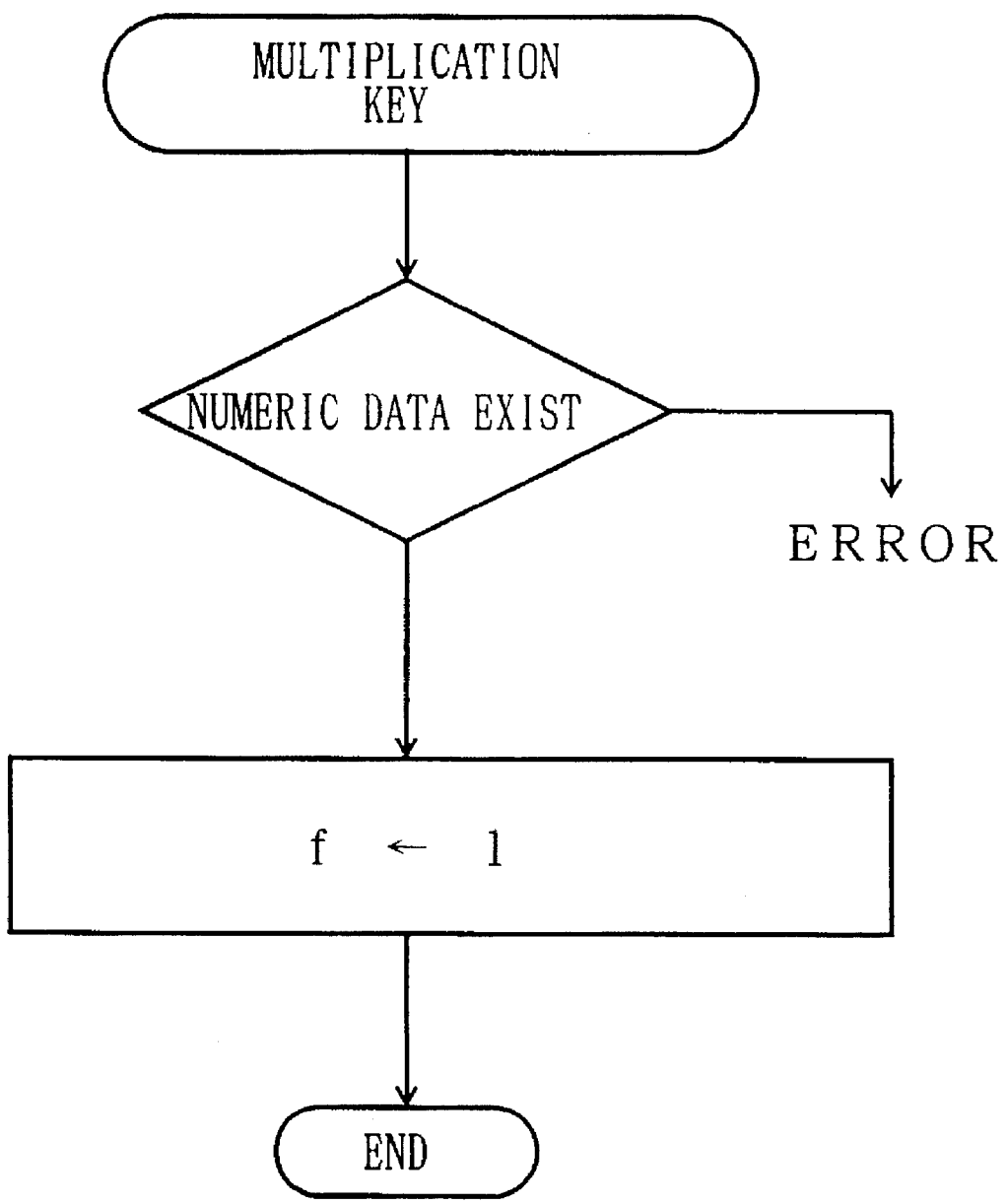
FIG. 9 is a flow chart showing a bundle-of-selling proclamation of the POS terminal according to the second embodiment.
Figure 10:
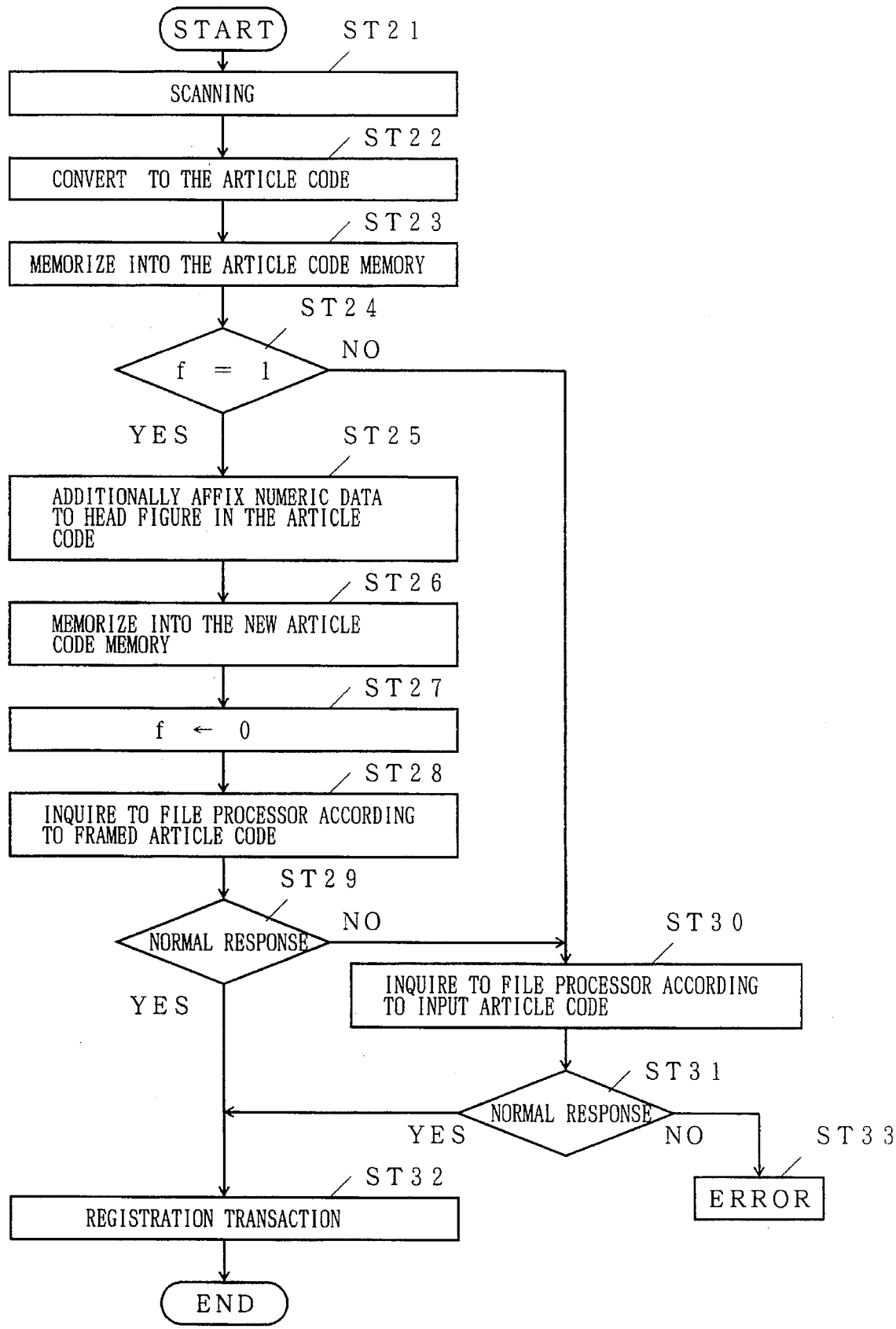
FIG. 10 is a flow chart showing a bundle-of-selling registration of the POS terminal according to the second embodiment.

As compared with the first embodiment, the memory map shown in FIG. 5 is changed to that shown in FIG. 8, and a CPU 19 executes a flow chart in FIG. 9 and FIG. 10 in place of the processing shown in the flow chart of FIG. 6 and FIG. 7. Other arrangements and operation of the second embodiment are the same as those of the first embodiment.

As shown in FIG. 8, RAM 23 includes an article code memory 65 for memorizing the article code inputted, a new article code memory 67 for memorizing the article code for the bundle-of-selling which is framed, a number data memory 69 for memorizing the number data which is inputted by the numeric keys 49, and the multiplication flag data memory 71 for memorizing "1" as the multiplication flag data (f) which indicate the operation of the multiplication key 52.

The product-selling-data processing apparatus includes the function that the number data inputted by the operation of the numeric keys 49 is memorized into the number data memory 69.

The CPU 19 performs a transaction, as shown in FIG. 9, when multiplication key 52 on the keyboard 29 is operated under the registration mode which has been selected by the mode switch 41. The CPU 19 discerns whether the number data is memorized in the number data memory 69. If the number data is memorized, "1" is established in the multiplication flag data memory 71 as the multiplication flag data (f).

The CPU 19 further performs a transaction as shown in FIG. 10. In step ST21, bar code data, converted from an article code, which is generally attached to an article as a bar code label is read by bar code scanner 43. The bar code data output from bar code scanner 43 is inversely converted to the article code (in step ST22) and the article code is memorized to the article code memory 59 (in step ST23). In step ST24, a status of the multiplication flag data (f) in the multiplication flag data memory 71 is examined.

If "1" is memorized in the multiplication flag data memory 71 as the multiplication flag data (f), the YES-path is taken. Otherwise, the NO-path is taken. When the YES-path is taken in step ST24, an article code for the bundle-of-selling (a third article code) is framed based on the article code memorized in the article code memory 65 (in step ST25). (framing means) The article code for the bundle-of-selling is framed such that the number data memorized in the number data memory 69 is added, as a head figure, to the numerical row of the article code memorized in the article code memory 65. In step ST26, the article code framed is memorized into the new article code memory 67. In step ST27, the multiplication flag data (f) in the multiplication flag data memory 71 is cleared to "0". In step ST28, the article information data, including an article name data, an article unit price data, which corresponds to the article code for the bundle-of-selling framed in step ST25 is inquired from the POS terminal 11 to the file processor 13. Then the POS terminal 11 reseives a response from the file processor 13. In step ST29, the response is examined in the POS terminal 11.

If the article information data is received, the YES-path is taken. Otherwise, the NO-path is taken. When the YES-path is taken in step ST29, the article selling data is obtained in accordance with the article information data. The article selling data includes a sold article number data and a sold amount data. The article selling data is transmitted to the file processor 13. The article selling data is added to the previously memorized article selling data in the article file 17 (in step ST32).

If the NO-path is taken in step ST24 or the NO-path is taken in step ST29, the article information data, which corresponds to the article code memorized in the article code memory 65 is inquired from the POS terminal 11 to the file processor 13 (in step ST30). The POS terminal 11 receives, a response from the file processor 13. In step ST31, the response is examined.

If the article information data is received, the YES-path is taken. Otherwise, the NO-path is taken. When the YES-path is taken in step ST31, the multiplicative registration transaction is performed in the POS terminal 11 (in step ST32).

The transaction of the file processor 13 is the same one of the first embodiment.

According to the second embodiment, the article information data and the article selling data are memorized in article file 17 in correspondence with the article code of each article. So, for bundle-of-selling articles, the article information data and the article selling data are memorized in correspondence with the article code for the bundle-of-selling. The article code for the bundle-of-selling is framed by additionally affixing the number data at the head figure of the article code which is used by an article selling. The article name data and the unit price data are memorized as the article information data of each article. And the name data for the bundle-of-selling article and selling amount data are memorized as the article information data for the bundle-of-selling articles. Since the bundle-of-selling proclamation keys 57 are not provided in the product-selling-data processing apparatus, it is possible to make the operation of the apparatus easier.

The present invention has been described with respect to a specific embodiment. However, other embodiments based on the principles of the present invention should be obvious to those of ordinary skill in the art. Such embodiments are intended to be covered by the claims.

What is claimed is:

1. A product-selling-data processing system which performs a bundle-of-selling in which a predetermined number of units of a given type of article, each having a unit price, are sold together at a price lower than the sum of the unit prices of said predetermined number of the given type of article, said system comprising:

a file processor and a terminal connecting with said file processor;

the file processor including:

memory means for storing a first article information comprising an article name data and a unit price data corresponding to a first article code and a second article information comprising an article name data and a bundle-of-selling price data corresponding to a second article code modified based on the first article code;

the terminal including;

communication means for transmitting/receiving data to/from the file processor;

display means for displaying the data received from the file processor;

print means for printing the data received from the file processor on a receipt paper;

optical reading means for inputting the first article code;

bundle-of-selling designating means for designating the execution of the bundle-of-selling and quantity of bundle-of-selling articles before inputting the first article codes by the optical reading means;

first transmitting means for transmitting the first article code input by the optical reading means to the file processor through the communication means to obtain the first article information from the file processor;

second transmitting means for transmitting the second article code based on the inputted first article code to the file processor through the communication means to obtain the second article information from the file processor;

selecting means for selecting one of the first transmitting means based on that the bundle-of-selling designating means has not been operated when the first article codes have been input by the optical reading means and the second transmitting means based on that the bundle-of-selling designating means has been operated when the first article codes have been input by the optical reading means; and outputting means for outputting the first article information received from the file processor as a response to the first transmitting means and the second article information received from the file processor as a response to the second transmitting means, to the display means and print means.

2. The system according to claim 1, wherein the second transmitting means includes framing means for framing the second article coda by affixing number data corresponding to the quantity of bundle-of-selling articles designated by the bundle-of-selling designating means to the first article code inputted by the optical reading means.

3. The system according to claim 1 further comprising re-executing means for executing again the first transmitting means to automatically obtain the first article information when the second transmitting means can not obtain the second article information from the file processor.

4. The system according to claim 1, wherein the bundle-of-selling designating means includes a key capable of making the bundle-of-selling designating and inputting the quantity of bundle-of-selling articles by a single operation.

* * * * *